United States Patent [19]

Kawajiri et al.

[11] Patent Number: 4,736,586
[45] Date of Patent: Apr. 12, 1988

[54] SEAL MECHANISM FOR A STIRLING ENGINE

[75] Inventors: Kazuhiko Kawajiri; Michio Fujiwara; Kazunori Tsuchino; Yoshio Kazumoto; Tamotsu Nomaguchi, all of Amagasaki, Japan

[73] Assignee: Mitsubishi Denki Kabushiki Kaisha, Tokyo, Japan

[21] Appl. No.: 896,188

[22] Filed: Aug. 14, 1986

[30] Foreign Application Priority Data

Aug. 30, 1985 [JP] Japan ............................ 60-192519
Sep. 4, 1985 [JP] Japan ............................ 60-195092
Sep. 4, 1985 [JP] Japan ............................ 60-195093

[51] Int. Cl.⁴ .......................... F02G 1/04; F16J 9/00
[52] U.S. Cl. ............................ 60/517; 277/157; 277/174; 277/193; 277/215; 277/216
[58] Field of Search ........... 60/517; 277/201, 215, 277/216, 174, 193, 138, 157

[56] References Cited

U.S. PATENT DOCUMENTS 3,396,976  8/1968  Reinhoudt et al. ............ 277/216 X

FOREIGN PATENT DOCUMENTS

| 27549 | 4/1981 | European Pat. Off. .......... 60/517 |
| 1942081 | 3/1971 | Fed. Rep. of Germany . |
| 2006292 | 8/1971 | Fed. Rep. of Germany . |
| 758678 | 1/1934 | France . |
| 1486698 | 6/1967 | France . |
| 1504821 | 12/1967 | France . |
| 52-85615 | 7/1977 | Japan . |
| 217038 | 1/1942 | Switzerland . |
| 402463 | 12/1933 | United Kingdom . |
| 732720 | 6/1955 | United Kingdom . |

OTHER PUBLICATIONS

Japan Patent Abstracts, vol. 1, No. 149, p. 5032 M 77, Nov. 17, 1987.
"Stirling Engine", G. Walker, Oxford University Press, 7/1980, p. 88.

Primary Examiner—Stephen F. Husar
Attorney, Agent, or Firm—Leydig, Voit & Mayer

[57] ABSTRACT

A seal mechanism for a Stirling engine has an upper and lower piston ring mounted on a displacer piston with a space therebetween and at least one piston ring mounted on a power piston. The seals produced by the piston rings of the displacer piston are given directionality in opposite directions so that the pressure within the space between the upper and lower piston rings is always higher or lower than the pressure within the expansion space and the compression space of the engine. In a preferred embodiment, the displacer piston rings each comprise two loosely-fitting outer rings which surround an inner ring. Air vents are formed in one surface of each of the inner rings between the center and the outer surface of the inner ring. The inner rings of the upper and lower piston rings are oriented so that the air vents face in opposite directions. Means for imparting directionality in the same direction to the seals produced by the power piston rings may also be provided.

5 Claims, 6 Drawing Sheets

SEAL MECHANISM FOR A STIRLING ENGINE

BACKGROUND OF THE INVENTION

This invention relates to a seal mechanism for a Stirling engine of the type having a displacer piston and a power piston slidably disposed inside a single cylinder.

In conventional Stirling engines, it is common to form a seal between the displacer piston and the cylinder wall by two sets of three-piece piston rings mounted on the displacer piston with a space therebetween. Each of the three-piece piston rings comprises two loosely-fitting outer rings which are stacked on top of one another and an inner ring disposed inside the outer rings. The power piston also has one or more similar three-piece piston rings mounted thereon. With this type of seal mechanism, there is the problem that fluttering of the displacer piston rings can easily develop due to the back and forth movement of the displacer piston. Due to the fluttering, a complete seal can not be obtained between the compression space and the expansion space of the engine, resulting in decreased engine output and thermal efficiency.

There is also the problem that it is easy for foreign matter such as dirt to enter the ring grooves of the displacer piston and the power piston, reducing the sealing ability of the piston rings and causing variation from cycle to cycle in the pressure in the compression space and the buffer space of the engine, as a result of which the output of the engine is unstable.

SUMMARY OF THE INVENTION

It is therefore an object of the present invention to provide a seal mechanism for a Stirling engine which can prevent fluttering of the piston rings of the engine.

It is another object of the present invention to provide a seal mechanism for a Stirling engine which can prevent foreign matter from entering the ring grooves and reducing the sealing performance of the piston rings.

It is yet another object of the present invention to provide a seal mechanism for a Stirling engine which can achieve the above effects while employing conventional piston rings.

In a conventional Stirling engine, the seals produced by the piston rings of the displacer piston and the power piston are not directional. For example, displacer piston rings which form a seal between the expansion space and the compression space of a Stirling engine prevent the flow of gas in both directions, from the expansion space into the compression space and from the compression space into the expansion space.

In contrast, in the present invention, the seals produced by the piston rings of at least the displacer piston have directionality, i.e., they can prevent the flow of gas in one direction but not in the opposite direction. Hereinbelow, the direction in which a seal has directionality refers to the direction of the gas flow which it can prevent. If it can prevent the flow of gas from a first chamber to a second chamber, then it will be referred to as having directionality towards the second chamber.

A seal mechanism according to the present invention comprises an upper and a lower piston ring mounted on a displacer piston with a space therebetween, at least one piston ring mounted on a power piston, and means for imparting directionality in opposite directions to the seals produced by the displacer piston rings. The upper piston ring forms a seal between the expansion space of the engine and the space between the upper and lower piston rings. While the lower piston ring forms a seal between the compression space and the space between the two piston rings. If the seals produced by the upper and lower piston rings are given directionality towards one another, the pressure within the space between the piston rings is maintained less than or equal to the pressure in the expansion space and the compression space, and the pressure difference causes the piston rings for the most part to be pressed towards one another. If the seals are given directionality away from one another, the pressure within the space between the piston rings is maintained greater than or equal to the pressure within the expansion space and the compression space, and the pressure difference causes the piston rings for the most part to be pressed away from one another. As each piston ring is nearly always being pressed by gas pressure in a single direction, fluttering of the piston rings is prevented and foreign matter is unable to enter between the ring grooves and the sealing surfaces of the piston rings.

According to one form of the present invention, the upper and lower piston rings of the displacer piston are three-piece rings comprising two loosely-fitting outer rings which are stacked on top of one another and an inner ring which fits inside the outer rings. Means for imparting directionality to the seals comprise air vents which are formed in one surface of each of the inner rings.

According to another form of the present invention, the upper and lower piston rings of the displacer piston are one-piece rings, and the means for imparting directionality comprise air vents which are formed in one surface of each of the one-piece rings.

According to another form of the invention, the upper and lower piston rings of the displacer piston are conventional piston rings, and the means for imparting directionality are channels or protrusions which are formed on one surface of the upper and lower ring grooves of the displacer piston.

A seal mechanism according to the present invention may also comprise means for imparting directionality in the same direction to the seals produced by the power piston rings. These means can have the same form as any of the means used to impart directionality to the seals for the displacer piston.

BRIEF DESCRIPTION OF THE DRAWINGS

In the drawings, the same reference numerals indicate the same or corresponding parts.

DESCRIPTION OF THE PREFERRED EMBODIMENTS

Hereinbelow, a number of preferred embodiments of the present invention will be described while referring to the accompanying drawings.

Figure 1:
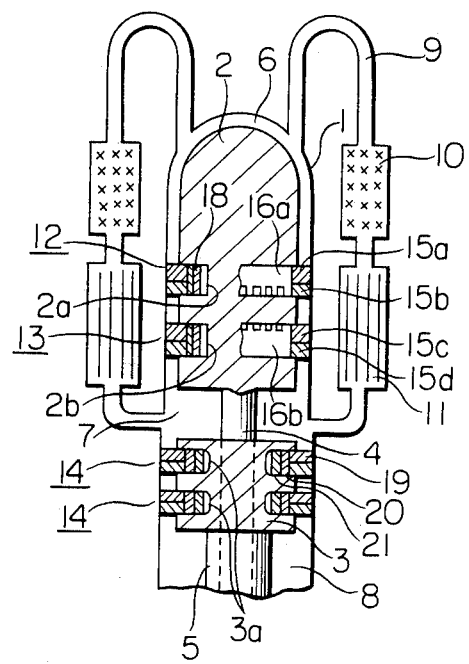
FIG. 1 is a schematic longitudinal view of a Stirling engine equipped with a first embodiment of a seal mechanism according to the present invention.

FIG. 1 illustrates in schamtic form a portion of a Stirling engine which employs a first embodiment of a seal mechanism according to the present invention. The Stirling engine has a domed cylinder 1 in which a displacer piston 2 and a power piston 3 are slidably disposed. The power piston 3 is connected to an unillustrated crankshaft by a power piston rod 5, and the displacer piston 2 is connected to the same crankshaft by a displacer piston rod 4 which passes through the center of the power piston 3 and the power piston rod 5. The displacer piston 2 and the power piston 3 divide the inside of the cylinder 1 into an expansion space 6 at the top of the cylindr 1, a compression space 7 between the displacer piston 2 and the power piston 3, and a buffer space 8 below the power piston 3.

A plurality of heater tubes 9 are secured to the top portion of the engine. One end of each heater tube 9 is connected to the top of the cylinder 1 and opens onto the inside of the expansion space 6. While the other end is connected to a regenerator 10. The regenerator 10 communicats with a heat exchanger 11 which in turn communicates with the inside of the compression space 7 of the cylinder 1.

The power piston 3 has two sets of conventional piston rings 14 which are mounted in piston ring grooves 3a and form a seal between the compression space 7 and the buffer space 8. Each of the piston.rings 14 comprises two loosely-fitting outer rings 19 which are stacked on top of one another and which surround an inner ring 20. The outer rings 19 and the inner ring 20 are ach split by a radial slit formed therein. A spring ring 21 is disposed inside the inner ring 20. The spring ring 21 exerts an outwards force on the inner ring 20, which in turn expands the outer rings 19 and presses them against the wall of the cylinder 1.

Figure 2:
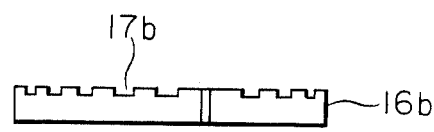
FIG. 2 is a side view of an inner ring of the embodiment of FIG. 1.

A seal is formed between the expansion space 6 and teh compression space 7 by an upper piston ring 12 and a lower piston ring 13 which are respectively mounted in an upper ring groove 2a and a lower ring groove 2b formed in the displacer piston 2. The upper piston ring 12 is a 3-piece ring consisting of an upper outer ring 15a, an identical lower outer ring 15b which sits beneath and contacts the upper outer ring 15a, and an inner ring 16a which is disposed inside the outer rings 15a and 15b. Similarly, the lower piston ring 13 is a 3-piece ring consisting of an upper outer ring 15c, an identical lower outer ring 15d, and an inner ring 16b. The outer rings 15a–15d fit loosely in the ring grooves 2a and 2b so as to be able to rotate therein and are each split by an unillustrated radial slit. As shown in FIG. 2, inner ring 16b has a plurality of air vents 17b formed in one surface which extend radially from the center of the inner ring 16b to its outer surface. The air vents 17b can be formed by cutting grooves in the surface of the inner ring 16b, or they can be created by forming protrusions on the surface. Similarly, inner ring 16a has a plurality of air vents 17a formed in one surface. These air vents 17a and 17b constitute means for imparting directionality in opposite directions to the seals produced by the upper piston ring 12 and the lower piston ring 13. The inner rings 16a and 16b should be oriented such that the surface of inner ring 16a in which air vents 17a are formed faces in the opposite direction from the surface of inner ring 16b having air vents 17b. In this embodiment, the inner rings are disposed such that the air vents 17a and 17b face towrds one another.

Like the outer rings 15a–15b, the inner rings 16a and 16b are each split by a radial slit. Inner rings 16a and 16b are pressed outwards towards the cylinder 1 by spring rings 18 provided inside thereof, and the inner rings 16a and 16b turn press the outer rings 15a–15d against the walls of the cylinder 1.

The operation of the illustrated seal mechanism is as follows. When the pressure in the expansion space 6 is higher than that within the space between the upper piston ring 12 and the lower piston ring 13, the inner ring 16a of the upper piston ring 12 is pressed downwards against the bottom surface of the upper ring groove 2a. However, because the bottom surface of inner ring 16a has air vents 17a formed in it, gas is able to leak through the air vents 17a and enter the space between the upper piston ring 12 and the lower piston ring 13 via the radial slit formed in outer ring 15b. As a result, the pressure within the space between the upper piston ring 12 and the lower piston ring 13 increases. On the other hand, when the pressure within the expansion space 6 falls below the pressure between the piston rings 12 and 13, inner ring 16a is pushed upwards against the upper surface of the upper ring groove 2a. As there are no air vents in the upper surface of inner ring 16a, a seal is formed by the inner ring 16a and by the outer rings 15a and 15b and no gas can leak from the space between the piston rings 12 and 13 into the expansion space 6. As a result, the pressure within the space between the piston rings 12 and 13 is maintained greater than or equal to that within the expansion space 6.

On the other hand, as the orientation of inner ring 16b is opposite to that of inner ring 16a, the pressure between the piston rings 12 and 13 is maintained greater than or equal to the pressure within the compression space 7.

Thus, the seal produced by the upper piston ring 12 has directionality in that it allows the flow of gas only from the expansion space 6 into space between the piston rings 12 and 13, and the seal produced by the lower piston ring 13 has directionality in the opposite direction in that it allow the flow of gas only from the compression space 7 into the space between the piston rings 12 and 13.

Therefore, the upper piston ring 12 is for the most part pressed against the upper surface of the upper ring groove 2a, and the lower piston ring 13 is for the most part pressed against the lower surface of the lower ring groove 2b. As a result, fluttering of the piston rings is suppressed, and a stable seal can be achieved. Furthermore, since the piston rings 12 and 13 are almost always pressed against one surface of the ring grooves 2a and 2b, foreign matter can not easily enter between the top surface of the upper piston ring 12 and the top surface of the upper ring grove 2a, or between the bottom surface of the lower piston ring 13 and the bottom surface of the lower ring groove 2b, and the sealing performance of the piston rings 12 and 13 is improved.

In this embodiment, the air vents 17a in inner ring 16a face towards the air vents 17b in inner ring 16b. However, it is also possible to reverse the orientation and to make the air vents 17a and 17b face away from one another. In this case, inner ring 16a will allow gas to flow from the inside of the space between the piston rings 12 and 13 into the expansion space 6 but not in the opposite directio, and inner ring 16b will allow gas to flow from the space between the piston rings 12 and 13 into the compression space 7 but not in the opposite direction. Therefore, the pressure in the space between the piston rings 12 and 13 will be maintained less than or equal to the pressure within the expansion space 6 or the compression space 7, the upper piston ring 12 will for the most part be pressed downwards against the bottom surface of the upper ring groove 2a, and the lower piston ring 13 will for the most part be pressed upwards against the top surface of the lower ring groove 2b. In the same manner as described above, fluttering of the piston rings 12 and 13 is suppressed, and foreign matter can be prevented from entering between the sealing surfaces of the piston rings 12 and 13 and the ring grooves 2a and 2b.

Figure 3:
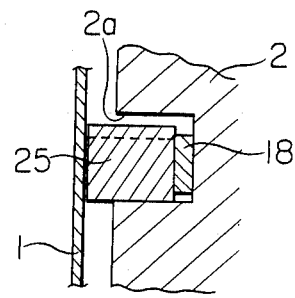
FIG. 3 is longitudinal cross-sectional view of a portion of a second embodiment of the present invention in which the displacer piston rings are one-piece rings.
Figure 4:
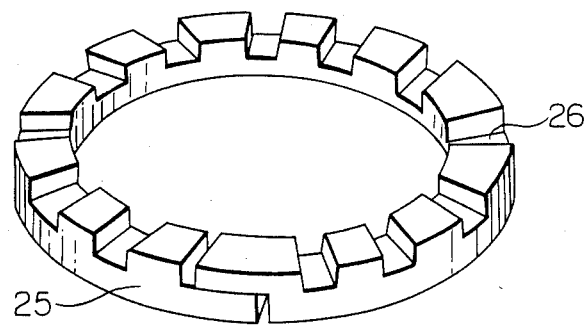
FIG. 4 is a perspective view of a one-piece piston ring for the embodiment of FIG. 3.

FIG. 3 is a cross-sectional view of a displacer piston ring 25 for another embodiment of a seal mechanism according to the present invention and FIG. 4 is a perspective view thereof. In this embodiment, the piston ring 25 is a one-piece split ring whose outer surface directly contacts the walls of the cylinder 1. As shown in FIG. 4, it has a plurality of air vents 26 formed in one surface which extend from the inside of the piston ring 25 to its outer surface. This one-piece ring 25 combines the functions of the outer rings and the inner rings of the piston rings 12 and 13 of the previous embodiment. The illustrated piston ring 25 is shown mounted in the upper ring groove 2a of the displacer piston 2. An identical piston ring is also mounted in the lower ring groove 2b, with the air vents 26 of the upper piston ring 25 facing in the direction opposite from the air vents in the unillustrated lower piston ring. The air vents in both piston rings can face either towards or away from one another. The operation of this embodiment is identical to that of the previous embodiment.

Figure 5:
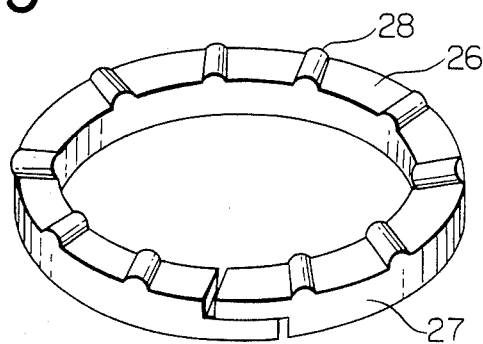
FIG. 5 is a perspective view of another type of one-piece piston ring for the embodiment of FIG. 3.

In the piston ring 25 of FIG. 4, the air vents 26 are formed by cutting channels in one surface of the piston ring 25, but it is possible to form air vents by other means. For example, FIG. 5 illustrates a displacer piston ring 27 in which protrusions 28 are formed on one surface of the piston ring 27, and air vents constitute the spaces between the protrusions 28. This piston ring 27 functions in a manner identical to the piston ring 25 of FIG. 4.

Figure 6:
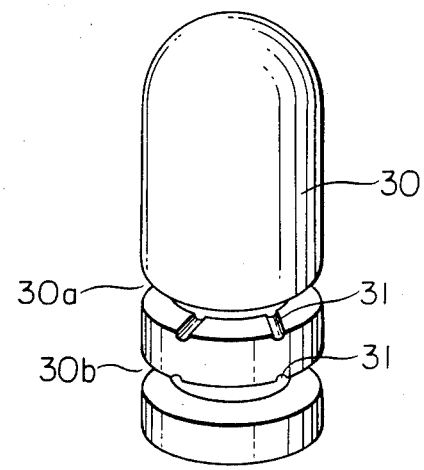
FIG. 6 is a perspective view of a displacer piston for a third embodiment of a seal mechanism according to the present invention.

FIG. 6 illustrates a displacer piston 30 used in a third embodiment of the present invention. In this embodiment, the displacer piston 30 has an upper ring groove 30a and a lower ring groove 30b formed therein, and the bottom surface of the upper ring groove 30a and the top surface of the upper ring groove 30b each have a plurality of channels 31 cut therein which serve as air vents. When assembled, this displacer piston 30 has conventional piston rings (such as the piston rings 14 for the power piston 3 shown in FIG. 1) mounted in the ring grooves 30a and 30b. The channels 31 constitute means for imparting directionality to the seals produced by the unillustrated piston rings. A Stirling engine in which this displacer piston 30 is employed is otherwise identical to the one illustrated in FIG. 1.

Because of the provision of the channels 31, the unillustrated displacer piston rings can prevent gas from passing from the space between the ring grooves 30a and 30b into the expansion space 6 but not in the opposite direction, and from the space between the ring grooves 30a and 30b into the compression space 7 but not in the opposite direction. Thus, the seals produced by the piston rings have directionality in opposite directions, and the pressure within the space between the ring grooves 30a and 30b is maintained greater than or equal to the pressure within the expansion space 6 or the compression space 7. The piston rings are thereby prevented from fluttering and foreign matter can not enter between the ring grooves 30a and 30b and the sealing surfaces of the piston rings.

In the embodiment illustrated in FIG. 6, channels 31 are formed in the bottom surface of the upper ring groove 30a and the top surface of the lower ring groove 30b. However, it is possible to instead provide them in the top surface of the upper ring groove 30a and the bottom surface of the lower ring groove 30b. In this case, the pressure within the space between the ring grooves 30a and 30b is maintained less than or equal to the pressure within the expansion space 6 and the pressure within the compression space 7.

Figure 7:
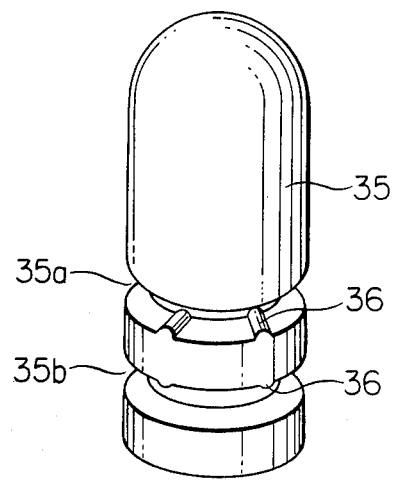
FIG. 7 is a perspective view of a displacer piston for a fourth embodiment of a seal mechanism according to the present invention.

FIG. 7 illustrates a displacer piston 35 according to a fourth embodiment of the present invention. In this embodiment, the displacer piston 35 has an upper ring groove 35a and a lower ring groove 35b formed therein. The bottom surface of the upper ring groove 35a and the top surface of the lower ring groove 35b each have a plurality of radially-extending protrusions 36 formed thereon. When the displacer piston 35 is assembled in a Stirling engine, the ring grooves 35a and 35b have conventional piston rings mounted thereon. The protrusions 36 constitute means for imparting directionality in opposite directions to the seals produced by the unillustrated piston rings. A Stirling engine in which this displacer piston 35 is employed is otherwise identical to the Stirling engine of FIG. 1.

In this embodiment, the protrusions 36 give the seals produced by the unillustrated piston rings directionality in the same directions as in the embodiment of FIG. 6. Accordingly, the pressure within the space between the ring grooves 35a and 35b is maintained greater than or equal to the pressure in the expansion space 6 or the compression space 7, and the unillustrated piston rings are for the most part pressed against the top surface of the upper ring groove 35a and the bottom surface of the lower ring groove 35b. The effects are the same as those provided by the embodiment shown in FIG. 6.

Alternatively, it is possible to form protrusions 36 on the top surface of the upper ring groove 35a and on the bottom surface of the lower ring groove 35b, in which case the seals produced by the unillustrated piston rings are given directionality in opposite directions such that the pressure within the space between the ring grooves 35a and 35b is maintained less than or equal to that within the expansion space 6 or the compression space 7. As a result, the unillustrated piston rings are for the most part pressed against the bottom surface of the upper ring groove 35a and the top surface of the lower ring groove 35b. This arrangement provides the same effects as the arrangement illustrated in FIG. 7.

Figure 8:
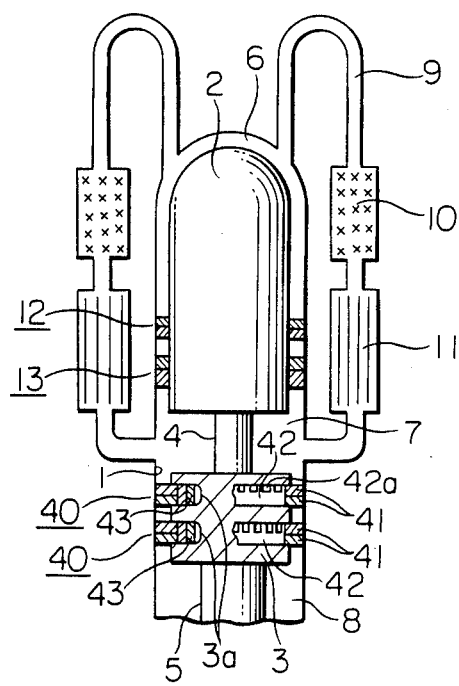
FIG. 8 is a schematic longitudinal view of a Stirling engine equipped with a fifth embodiment of a seal mechanism according to the present invention.

In each of the previous embodiments, the seal mechanism for the power piston 3 consists of conventional piston rings 14 which produce nondirectional seals. However, in a fifth embodiment of a seal mechanism according to the present invention, the seal mechanism for the power piston 3 includes means for imparting directionality in the same direction to the seals produced by the power piston rings. This embodiment is illustrated in FIG. 8. The power piston 3 has two sets of piston rings 40 mounted in corresponding piston ring grooves 3a. Each of the piston rings 40 is a 3-piece ring similar to the 3-piece piston rings 12 and 13 of FIG. 1. They each comprise two split outer rings 41 which are stacked on top of one another and which loosely fit around a split inner ring 42 which is similar to inner rings 16a and 16b and has air vents 42a formed in one surface. Each inner ring 42 is pressed outwards against the outer rings 41 by a spring ring 43 disposed at its center. The air vents 42a of the inner rings 42 should face in the same direction, and in the present embodiment, both inner rings 42 are oriented so that all the air vents 42a point upwards. The air vents 42a constitute means for imparting directionality in the same direction to the seals produced by the piston rings 40. The illustrated seal mechanism for the displacer piston 2 is the same as the one shown in FIG. 1, but it is possible for it to be the same as in any of the previous embodiments.

During the operation of this embodiment, because of the directionality of the seals produced by the piston rings 40, gas is able to pass from the buffer space 8 into the compression space 7 but not in the opposite direction. As a result, the pressure in the compression space 7 is always greater than or equal to the pressure within the buffer space 8, and for the most part, the piston rings 40 are pressed downards against the bottom surfaces of the piston ring grooves 3a. Therefore, foreign matter can not enter between the bottom surfaces of the piston rings 40 and the bottom surfaces of the ring grooves 3a. The sealing performance of the piston rings 40 can therefore be maintained for a long period and the output of the engine can be stabilized.

On the other hand, if the inner rings 42 of both piston rings 40 are oriented so that the air vents 42 face downwards, then the pressure within the buffer space 8 will be greater than or equal to the pressure within the compression space 7, and for the most part, the piston rings 40 will be pressed upwards against the top surfaces of the piston rings grooves 3a, and the same effects are obtained as in the embodiment illustrated in FIG. 8.

In the embodiment illustrated in FIG. 8, the piston rings 40 are both 3-piece rings, but it is possible to instead employ one-piece piston rings like the displacer piston rings 25 and 27 illustrated in FIG. 4 and FIG. 5, respectively. If one-piece piston rings are employed. They should be oriented so that the air vents of both piston rings face in the same direction.

Figure 9:
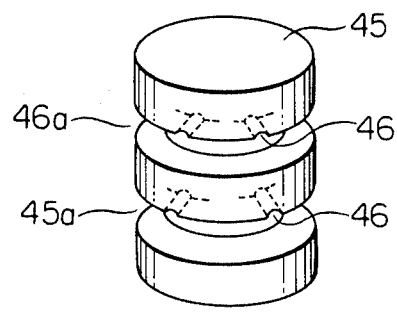
FIG. 9 is a perspective view of a power piston for a sixth embodiment of a seal mechanism according to the present invention.

FIG. 9 illustrates a power piston 45 for a sixth embodiment of a seal mechanism according to the present invention. The power piston 45 has two ring grooves 45a in which are mounted unillustrated, conventional piston rings such as the 3-piece piston rings 14 of FIG. 1. The top surface of each ring groove 45a has a plurality of radially-extending channels 46 formed therein which serve as air vents. These channels 46 constitute means for imparting directionality in the same direction to the seals produced by the unillustrated piston rings. The seal mechanism for the displacer piston of a Stirling engine with which this power piston 45 is employed can be the same as that of any of the first through fourth embodiments.

The operation of this embodiment is identical to that of the embodiment illustrated in FIG. 8. Namely, because of the provision of the channels 46, the unillustrated piston rings can prevent gas from passing from the compression chamber 7 to the buffer space 8 but not in the opposite direction. The pressure within the compression space 7 is maintained greater than or equal to that in the buffer space 8, and for the most part the unillustrated piston rings are pressed against the bottom surfaces of the ring grooves 45a, the sealing performance of the piston rings is maintained, and the operation of the engine is stabilized.

On the other hand, if the channels 46 are instead formed in the bottom surfaces of both ring grooves 45a, the pressure within the buffer space 8 will be maintained greater than or equal to that in the compression space 7, and for the most part the unillustrated piston rings will be pressed against the top surfaces of the ring grooves 45a, providing the same effects as the embodiment illustrated in FIG. 9.

Figure 10:
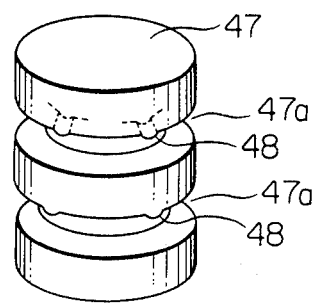
FIG. 10 is a perspective view of a power piston for a seventh embodiment of a seal mechanism according to the present invention.

FIG. 10 illustrates a power piston 47 for a seventh embodiment of the present invention. This power piston 47 has upper and lower ring grooves 47a, and in the top surface of each ring groove 47a is formed a plurality of radially-extending protrusions 48. When assembled as part of a Stirling engine, conventional piston rings are mounted in the ring grooves 47a. The protrusions 48 constitute means for imparting directionality in the same direction to the seals produced by the unillustrated piston rings. The seal mechanism for the displacer piston of a Stirling engine in which this power piston 47 is employed can be the same as that of any of the first through fourth embodiments.

Because the bottom surface of each ring groove 47a is smooth while the top surface has protrusions 48 formed thereon, the unillustrated piston rings can prevent gas from passing from the compression space 7 into the buffer space 8, but not in the opposite direction. The pressure within the compression space 7 is therefore maintained greater than or equal to that within the buffer space 8, and for the most part, the unillustrated piston rings are pressed against the bottom surfaces of the ring grooves 47a. As a result, the sealing performance of the piston rings is maintained, just as in the previous embodiments.

On the other hand, if protrusions 48 are instead formed on the bottom surface of each ring groove 47a, the pressure within the buffer space 8 will be maintained greater than or equal to that within the compression space 7, and the unillustrated piston rings will for the most part be pressed against the upper surfaces of the ring grooves 47a, and the same effects as in the embodiment illustrated in FIG. 10 can be achieved.

In the embodiment of FIG. 1, conventional three-piece piston rings 14 are mounted in the ring grooves 3a of the power piston 3. During the operation of the engine, the reciprocation of the power piston 3 causes the two loosely-fitting outer rings 19 and the inner ring 20 to rotate inside the ring grooves 3a. This rotation is desirable since it prevents the unbalanced wear of the piston rings 14 and damage to the cylinder 1. However, the rotation may result in the slit in one of the outer rings 19 coinciding with the slit in the other outer ring 19 or with the slit in the inner ring 20, in which case gas can leak through the coinciding slits, reducing the sealing performance of the piston rings 14.

Figure 11:
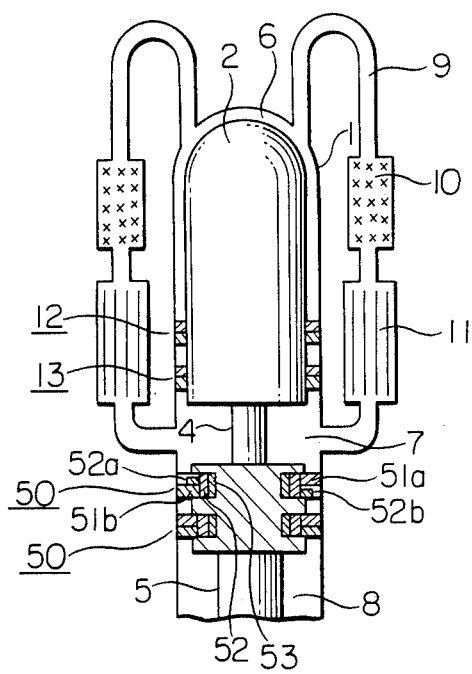
FIG. 11 is a schematic longitudinal view of a Sterling engine equipped with an eighth embodiment of a seal mechanism according to the present invention.
Figure 12:
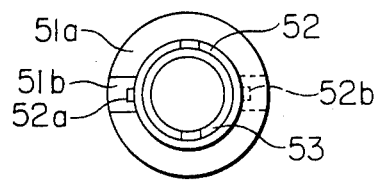
FIG. 12 is a top view of one of the power piston rings of FIG. 11.
Figure 13:
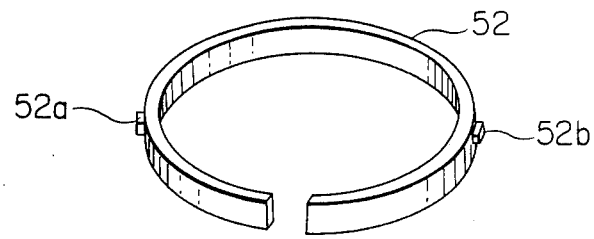
FIG. 13 is a perspective view of an inner ring of the embodiment of FIG. 11.

FIG. 11 illustrates an eighth embodiment of a sealing mechanism according to the present invention in which this problem is solved by the provision of means for preventing the slits of power piston rings from coinciding with one another. As shown in FIG. 11, the piston rings 50 of a power piston 3 each comprise an upper and a lower loosely-fitting outer ring 51a and 51b, respectively, stacked atop one another, an inner ring 52 which fits inside the outer rings 51a and 51b, and a spring ring 53 which fits inside the inner ring 52 and forces it radially outwards. Each of the rings is split by a radial slit formed therein. As shown in FIG. 13, each inner ring 52 has an upper projection 52a and a lower projection 52b formed on or secured to its outer surface by bonding or other suitable means. The projections 52a and 52b are separated from one another by 180 degrees and are each separated from the slit in the inner ring 52 by 90 degrees. The upper projection 52a is disposed on the top half of the inner ring 52 and the lower projection 52b is disposed on the lower half. These projections 52a and 52b serve as means for preventing the slits in the inner ring 52 and the outer rings 51a and 51b from coinciding. As shown in FIG. 12, which is a top view of one of the piston rings 50 of FIG. 11, when the piston rings 50 are assembled, the upper projection 52a is inserted into the slit in the upper outer ring 51a and the lower projection 52b is inserted into the slit in the lower outer ring 51b. The illustrated seal mechanism for the displacer piston 2 is the same as that of FIG. 1, but it may be same as in any of the first through fourth embodiments.

During the operation of this embodiment, due to the provision of the projections 52a and 52b, the outer rings 51a and 51b can not rotate with respect to each other or with respect to the inner ring 52, and all three rings 51a, 51b, and 52 rotate inside the ring grooves 3a as a single body, with the slits in the outer rings 51a and 51b separated from one another by 180 degrees and from the slit in the inner ring 52 by 90 degrees. Accordingly, it is impossible for the slits to coincide and there is no gas leakage therethrough.

As long as the slits in the inner ring 52 and the outer rings 51a and 51b are prevented from coinciding, there is no restriction on the angular positions of the projections 52a and 52b with respect to each other or with respect to the slit in the inner ring 52. For example, as shown in FIG. 14, it is possible for the projections 52a and 52b to be displaced from one another and from the slit in the inner ring 52 by 120 degrees, in which case the slits in the outer rings 51a and 51b are likewise separated from one another and from the slit in the inner ring 52 by 120 degrees.

Figure 14:
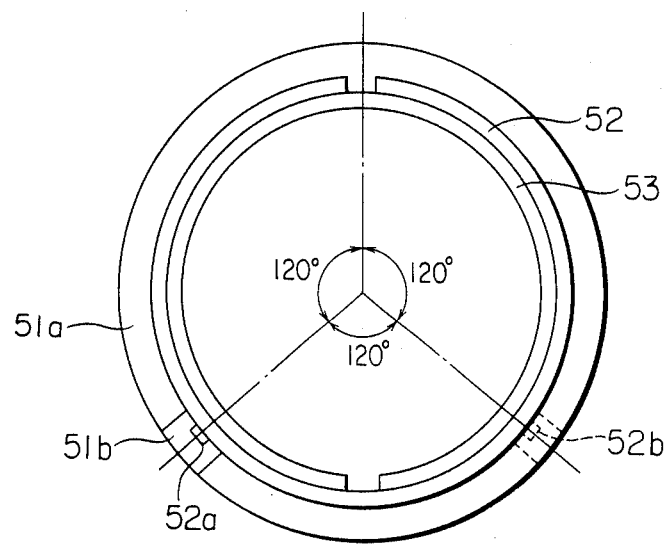
FIG. 14 is a view similar to FIG. 12 showing an alternate angular relationship among the inner and outer rings of the power piston rings of the embodiment of FIG. 11.
Figure 15:
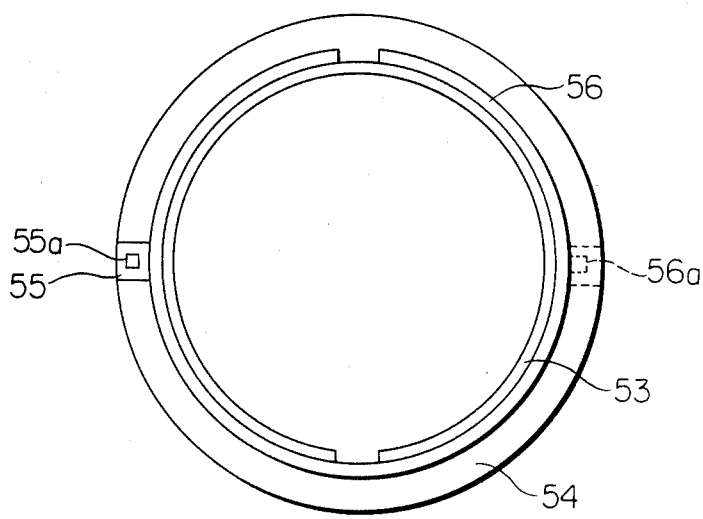
FIG. 15 is a view similar to FIG. 12 showing another type of power piston ring which can be employed in the present invention.

FIG. 15 is a top view of another type of piston ring which can be employed in the present invention. Like the piston rings of FIGS. 12 and 14, it comprises upper and lower loosely-fitting outer rings 54 and 55, respectively, an inner ring 56, and a spring ring 53 which is disposed inside the inner ring 56. The inner ring 56 has a single projection 56a formed on or secured to the lower half of its outer surface, and this projection 56a is inserted into the slit of the lower outer ring 55. The lower outer ring 55 has a similar projection on its top surface which is inserted into the slit in the upper outer ring 54. Like projections 52a and 52b in the embodiment of FIG. 11, the projections 55a and 56a maintain a constant angular relationship between the slits in the outer rings 54 and 55 and the inner ring 56 and prevent the slits from coinciding, thereby preventing gas leaks through the slits. Although in FIG. 15 the slits in the outer rings 54 and 55 are shown separated from one another by 180 degrees and from the slit in the inner ring by 90 degrees, the angular relationship can be varied without altering the effects.

Piston rings of the types illustrated in FIGS. 12, 14, and 15 can be used not only on the conventional power piston 3 of FIG. 11, but also on the power pistons illustrated in FIG. 9 and FIG. 10, as well as on the displacer pistons illustrated in FIG. 6 and FIG. 7 with the same effects.

In each of the preceding embodiments, the power piston was equipped with two sets of piston rings, but the number of sets of power piston rings which are employed can be varied without altering the effects of the present invention.

What is claimed is:

1. A seal mechanism for a Stirling engine of the type having a displacer piston and a power piston slidably disposed inside a cylinder, the displacer piston having an upper ring groove and a lower ring groove and the power piston having one or more ring grooves, said seal mechanism comprising:
   an upper displacer piston ring which is mounted in said upper ring groove;
   a lower displacer piston ring which is mounted in said lower ring groove;
   said upper displacer piston ring and said lower displacer piston ring each comprise two loosely-fitting outer rings which are stacked on top of one another and which are each split by a slit in the radial direction, and an inner ring which is disposed inside of said outer rings;
   one or more power piston rings, each of which is mounted in one of said ring grooves of said power piston; and
   means for rendering the seals produced by said upper displacer piston ring and said lower displacer piston ring unidirectional in opposite directions, said last mentioned means comprising vents which are formed in one surface of said inner ring between the center and the outer surface of said inner ring, the surface having said vents of said inner ring of said upper displacer piston ring facing in the opposite direction from the surface having vents of said inner ring of said lower displacer piston ring.

2. A seal mechanism as claimed in claim 1 further comprising means for rendering the seal formed by each of said power piston rings unidirectional in the same direction.

3. A seal mechanism as claimed in claim 2 wherein:
   each of said power piston rings comprises two loosely-fitting outer rings which are stacked on top of one another and which are split by a slit in the radial direction and an inner ring which is disposed inside of said outer rings; and said means for rendering the seals produced by said power piston rings unidirectional in the same direction comprises vents formed in one surface of each of said inner rings between the center and the outer surface thereof, each of said inner rings being oriented such that the surfaces in which said vents are formed all face in the same direction.

4. A seal mechanism as claimed in claim 1, wherein each of said power piston rings comprises:

two loosely-fitting outer rings which are stacked on top of one another and which are each split by a slit in the radial direction;

an inner ring which is disposed inside of said outer rings and which is split by a slit in the radial direction; and means for preventing the slits in said outer rings and the slit in said inner ring from coinciding.

5. A seal mechanism as claimed in claim 4 wherein said means for preventing slits from coinciding comprise:

two projections secured to the outer surface of said inner ring, one of which engages with the slit in one of said outer rings and the other of which engages with the slit in the other of said outer rings.

* * * * *